United States Patent [19]

Kocsis et al.

[11] Patent Number: 5,014,599
[45] Date of Patent: May 14, 1991

[54] TWO PIECE HYDRAULIC PISTON ASSEMBLY WITH SWAGED PISTON-SLEEVE JOINT

[75] Inventors: Judith Kocsis; Joseph A. Stojkov, both of Farmington Hills; Michael E. Towler, Ypsilanti, all of Mich.

[73] Assignee: Federal-Mogul Corporation, Southfield, Mich.

[21] Appl. No.: 484,954

[22] Filed: Feb. 26, 1990

[51] Int. Cl.[5] .............. F16J 1/10; F16J 9/12; F01B 31/00; F16B 9/00
[52] U.S. Cl. .......................... 92/84; 92/113; 92/130 R; 92/172; 92/240; 92/245; 403/261; 403/274
[58] Field of Search ............ 92/84, 99, 100, 109, 92/113, 114, 129, 130 R, 172, 175, 240, 245, 255, 259; 403/242, 261, 274, 284; 29/888.04, 888.042; 188/77 R

[56] References Cited

U.S. PATENT DOCUMENTS

| | | | |
|---|---|---|---|
| 3,080,890 | 3/1963 | Papa | 92/99 X |
| 3,103,991 | 9/1963 | Flinn | 188/77 R X |
| 3,182,362 | 5/1965 | Dobrikin | 403/242 X |
| 3,183,795 | 5/1965 | Kirk | 92/245 X |
| 3,557,911 | 1/1971 | Ellard | 188/77 R |
| 3,571,903 | 3/1971 | Persson | 403/242 X |
| 4,881,453 | 11/1989 | Armstrong | 92/84 |

Primary Examiner—John T. Kwon
Assistant Examiner—George Kapsalas
Attorney, Agent, or Firm—Lawrence J. Shurupoff

[57] ABSTRACT

A piston and piston support rod assembly in which the piston is formed as a sheet metal stamping. A central sleeve is attached to the end wall of the stamped piston by a swaging operation performed on an annular section of the end wall. An undercut area of the sleeve defines a mandrel surface that effectively grips the end wall material deformed by the coining operation. A principal advantage of the new structure is a relatively low manufacturing cost.

13 Claims, 4 Drawing Sheets

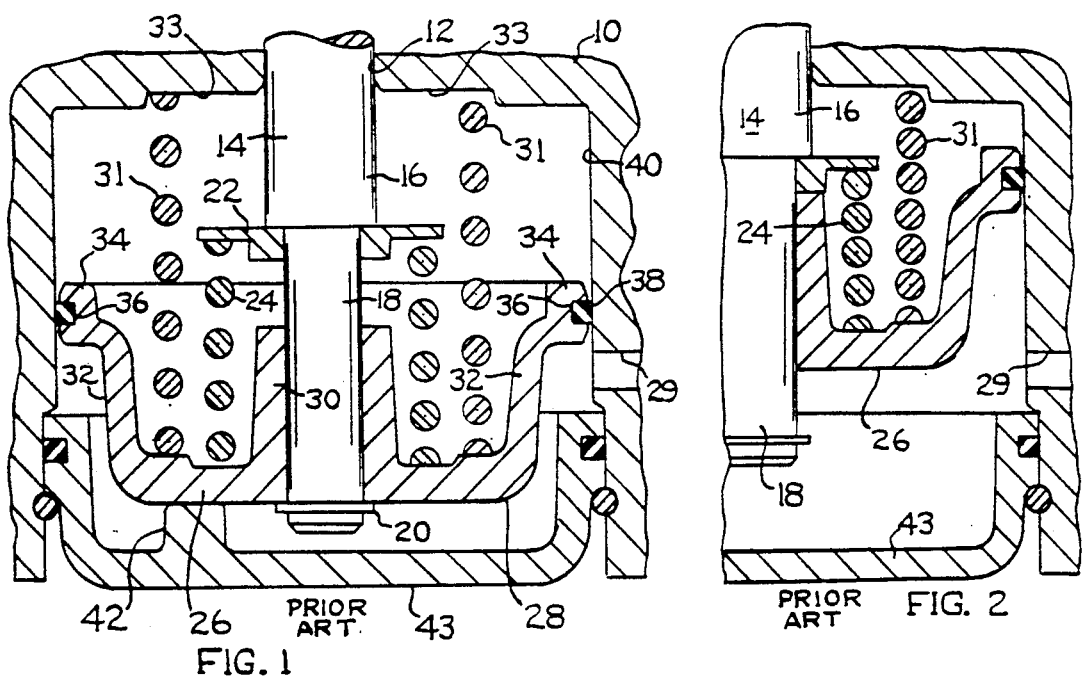

TWO PIECE HYDRAULIC PISTON ASSEMBLY WITH SWAGED PISTON-SLEEVE JOINT

BACKGROUND OF THE INVENTION

1. Field of the Invention

This invention relates to piston and piston rod assemblies, particularly such assemblies as are used in relatively small sized hydraulic actuators, on the order of three inches in diameter.

2. Description of the Prior Art

U.S. Pat. No. 4,628,795 issued to J. Pickard, et al shows one environment in which the invention can be practiced. The patent shows a brake band for an automotive transmission, and a piston-cylinder assembly for driving the band to its engaged or disengaged positions.

At least one application uses a double motion piston and piston rod assembly to operate each transmission band. When pressurized liquid is supplied to the piston the piston slides along the associated piston rod against the action of a load spring carried on the rod. The piston impacts against the piston rod to drive the rod through its designated stroke for operating the brake band.

In the described system the piston is formed as a one-piece metal casting having a cup-shaped configuration. The casting includes a central sleeve section slidable on the piston rod, a radial end wall extending radially outwardly from one end of the central sleeve section, and an outer annular side wall extending axially from the radial end wall. The free end of the annular side wall is turned outwardly to define a peripheral lip.

A groove is machined into the edge of the peripheral lip to form a seating area for a seal member. During service, the seal engages the associated cylinder side wall to prevent liquid flow across the piston-cylinder interface. The casting process required to form the one piece piston is relatively costly. Additional cost is involved in machining the annular groove that seats the seal.

An alternative approach to manufacturing such a piston relied upon forming the piston as a one-piece stamping. Although one-piece stampings have previously been formed as cup-shaped pistons, the bend radii required to achieve desired die draw depths has precluded the use of one-piece stampings in many applications. That is, the large curved bend profiles needed to prevent tearing or cracking of the stamped sheet metal often interfered with other piston assembly components such as biasing springs and the like. For example, the curved surfaces of the bend formed between the end wall and side wall of the piston have prevented the proper seating and alignment of piston biasing springs which typically are seated on flat rather than curved surfaces.

SUMMARY OF THE INVENTION

The present invention concerns a two piece piston and sleeve assembly which includes a low cost stamped piston cup which is not limited in shape by large bend radii and which may be used in virtually any hydraulic piston application. The piston assembly of the present invention preferably includes a central sleeve adapted to slide on an associated piston support rod, and a cup-shaped piston formed as a low cost steel stamping. The radial end wall of the stamped piston is affixed to the central sleeve by a low cost coining operation that involves an angular deformation of the end wall material into an annular pocket formed by a contoured mandrel surface on the end of the central sleeve. Thus, by forming the piston and sleeve as a two piece assembly the need for large bend radii between the piston and sleeve is obviated.

This stamped piston includes an outturned flange extending from the cup side wall. An elastomeric annular sealing lip is bonded by conventional known molding techniques to the outturned flange for sealing the piston-cylinder interface with a resilient biased sliding fit. The sealing lip has a cantilever connection to the metal flange, such that the lip can maintain its biased engagement with the cylinder wall in spite of manufacturing tolerance variations in the various components.

The newly-devised central sleeve requires some machining operations. However the steel stamping is usable without any machining operations thereon. Cost reduction results from a lesser machining cost, and also because of the use of a low cost stamping process, as opposed to a casting process. Moreover, the two-piece piston and sleeve assembly takes up less space than prior one piece cast or stamped sleeved pistons.

BRIEF DESCRIPTION OF THE DRAWINGS

FIG. 1 is a cross sectional view taken through a piston-cylinder assembly constructed according to prior art practice.

FIG. 2 is a fragmentary view taken in the same direction as FIG. 1 but showing the piston and piston rod assembly in a different operating position.

DETAILED DESCRIPTION OF THE PREFERRED EMBODIMENTS OF THE INVENTION

Figure 3:
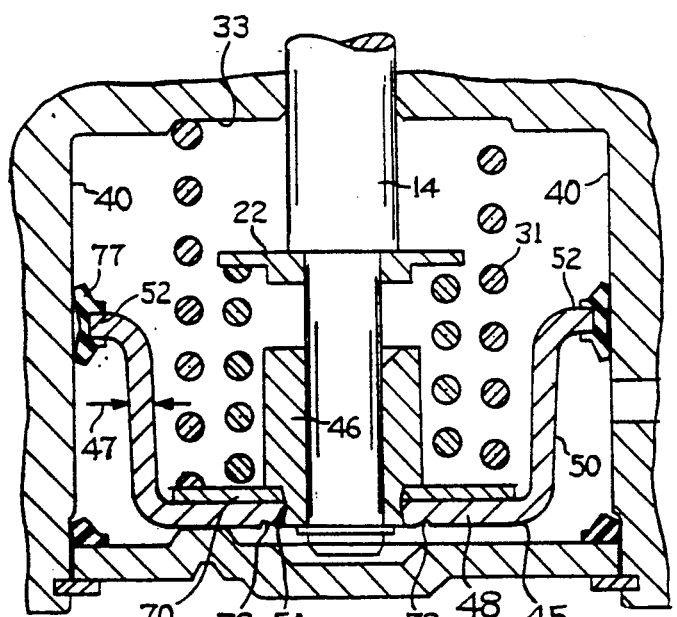
FIG. 3 is a sectional view taken in the same direction as FIG. 1, but showing a piston constructed according to the present invention.

Referring to FIG. 1, there is shown a prior art hydraulic actuator that includes a cylinder 10 having a central guide surface 12 for a slidable piston rod 14. The piston rod is of a stepped construction, including a relatively large diameter piston rod section 16 and a relatively small diameter rod section 18. Near its outer (lower) end the rod section 18 has an annular groove that receives a retaining ring 20. The non-illustrated (upper) end of piston rod 14 is connected to a transmission band in a generally similar fashion to the connection shown in previously-mentioned U.S. Pat. No. 4,628,795.

The juncture between rod sections 16 and 18 accommodates an annular spring retainer element 22. The associated coil spring 24 extends between element 22 and the end wall 26 of a piston 28. Piston 28 is formed as a one-piece metal casing.

Piston 28 includes an inner central sleeve 30 slidable on rod section 18, a radial end wall 26 connected to one end of sleeve 30, and an outer annular side wall 32.

Because piston 28 is cast, large bend radii are not required between end wall 26 and side wall 32. As well as between end wall 26 and central sleeve 30. This allows sufficient space on the inner surface of end wall 32 for seating coil springs 31 and 24.

An annular outwardly-radiating flange 34 is formed around and along the upper edge of wall 32. An annular groove 36 is machined into the edge surface of flange 34 to accommodate an annular elastomeric seal 38. Additional machining operations are performed on the outer edge surfaces of flange 34 to form chamfers on the upper and lower corner areas of the flange.

Piston rod guide surface 12 controls the line of action of piston rod 14 and annular piston 28. Flange 34 is in near adjacency to the associated cylinder wall 40 without actually touching that wall. The machining tolerances on the edge of flange 34 must be relatively close in order that groove 36 has the correct depth and radial position to maintain seal 38 in close sliding engagement with cylinder wall 40.

Sleeve 30 has a relatively close sliding fit on rod section 18, such that pressurized liquid is prevented from migrating upwardly through the sliding interface between the rod and sleeve. The inner diameter of sleeve 30 should exceed the diameter of rod section 18 by no more than 0.0005 to 0.002 inch in order to preclude liquid flow along the rod-sleeve interface.

Pressurized liquid can be supplied to the space below piston 28 through a port 29. The same port can be used to exhaust liquid from the space below the piston. FIG. 2 fragmentarily shows the piston in its deflected position, i.e. the position when the space below the piston is pressurized. The piston is moved upwardly against the force of previously mentioned coil spring 24 and a second coil spring 31 located between the piston and cylinder end wall 33. Piston rod 14 is deflected upwardly by reason of the liquid pressure on its lower end surface, and also by reason of the impact action of piston sleeve 30 on spring retainer 22. Coil spring 24 acts as a cushion. Coil spring 31 acts as a piston return spring.

Piston 28 and rod 14 are returned to their FIG. 1 positions when the liquid pressure below the piston is suitably decreased. Springs 24 and 31 supply the return force. Downward motion of the piston is limited by pads (buttons) 42 formed on cover 43 or on the piston wall 48. In a typical situation the cover would have three circumferentially spaced pads. During the downstroke of piston 28 snap ring 20 is acted upon by piston end wall 26 to return piston rod 14 to its FIG. 1 position.

As noted above, FIGS. 1 and 2 illustrate a known prior art arrangement. The present invention is concerned with a cost, space and weight reduction improvement of the prior art arrangement by substituting a two-piece stamped piston and central sleeve assembly for a one-piece cast or stamped assembly. FIG. 3 shows one form that the invention can take. The cylinder wall 40 and piston rod can be constructed to the same configuration and tolerances as the structure shown in FIG. 1. The new feature of interest relates to the construction of the piston and associated central sleeve. As seen in FIG. 3 the central sleeve 46 is formed of bar stock (steel) suitably drilled and bored to have a close sliding fit on piston rod section 18. The piston 45 is formed separately from sleeve 46 as a sheet metal stamping having a somewhat lesser wall thickness than the corresponding cast piston of FIG. 1. Typically the wall thickness of the stamped piston (designated by numeral 47) is about 0.090 inch.

The stamped piston includes a radial end wall 48, an annular side wall 50 extending axially from wall 48, and a flange 52 extending radially outwardly from side wall 50 so that its outermost edge section is parallel to wall 48. The cup-shaped metal stamping has a relatively constant wall thickness and is formed from a flat steel sheet by a reduction drawing process or by a series of stamping dies of progressively increasing depth.

Figure 4:
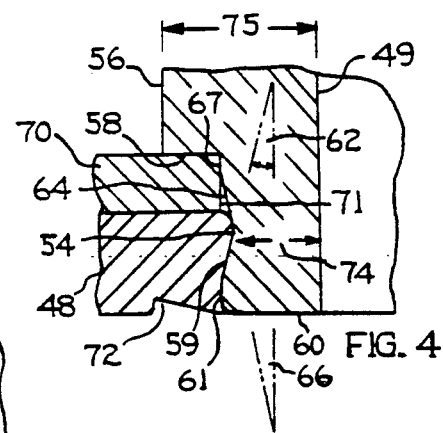
FIG. 4 is an enlarged fragmentary sectional view of a structural detail employed in the FIG. 4 piston structure.

During the stamping operation a central hole is formed in piston end wall 48. This hole is sized to fit snugly on a mandrel surface 54 that is machined on the lower end section of sleeve 46. FIG. 4 shows the cross sectional configuration of the mandrel surface. As shown, the mandrel surface is a generally axial surface formed by an undercut in the sleeve side surface 56. The undercut forms a radial shoulder 58 at the upper end of mandrel surface 54.

Mandrel surface 54 has a shallow V cross-sectioned profile as seen in FIG. 4. Section 59 of the mandrel surface extends upwardly from sleeve end face 60, with a slight inward component toward the sleeve axis, as designated by angle 62 in FIG. 4. This angle is preferably about ten degrees.

The mandrel surface 54 further includes a second surface section 64 that extends downwardly from radial shoulder 58, with a slight inward component toward the sleeve axis, as designated by angle 66 in FIG. 4. The two angulated (conical) surface sections 59 and 64 meet and merge smoothly at a point approximately midway between the plane of shoulder 58 and the plane of sleeve end face 60.

The corner 61 between sleeve end face 60 and mandrel surface section 59 is preferably chamfered, as shown in FIG. 4. Also, the juncture between shoulder 58 and angulated conical surface section 64 preferably includes a short axial surface 67.

A flat-faced steel washer 70 may be placed between shoulder 58 and the upper face of piston end wall 48. The central hole through washer 70 is sized so that the internal circular edge 71 of the washer is substantially snug against axial surface 67. Initially the central hole through piston end wall has the same diameter as the hole through washer 70, such that the internal edges of the two holes are in alignment.

End wall 48 of the piston is affixed to sleeve 46 by mechanically deforming an annular section of wall 48 upwardly and radially inwardly toward the juncture between shoulder 58 and mandrel surface 54 during a swaging operation. The deforming operation produces an annular depression 72 in the lower face of wall 48. This annular depression is preferably formed by a rotary orbiting swaging tool. The tool applies a deforming force against the lower face of wall 48 while at the same time rotating around the sleeve 46 axis. Wall 48 experiences a localized flow or shift of material upwardly and radially inwardly into the apex of the V-shaped hollow space defined by mandrel surface 54. FIG. 4 illustrates the condition of wall 48 after the swaging operation.

In order to ensure a given dimension on the sleeve 46, the mandrel surface 54 is typically spaced from surface 49 by a radial distance 74 that is greater than fifty percent of the sleeve wall thickness, designated by numeral 75. With such a relationship the annular sleeve section that defines the mandrel surface 54 is thick enough to effectively resist the forces generated during the swaging operation. Typically the sleeve thickness dimension 75 will be about 0.2 inch and the corresponding dimension 74 will be at least about 0.12 inch.

It will be noted from FIGS. 1 and 3 that the combined thickness of washer 70 and piston end wall 48 (FIG. 3) is approximately the same as the thickness of piston end wall 26 (FIG. 1). Typically the combined thickness of the washer 70 and wall 48 is about 0.18 inch. Because the available seating spaces for springs 24 and 31 are maintained, such that the original spring designs used in prior one-piece cast pistons can be used in the FIG. 3 system. Spring action is essentially the same in the two systems. By avoiding the previously noted large bend radii between sleeve 46 and end wall 48 and between side wall 50 and end wall 48, a flat mounting surface is provided for seating springs 24 and 31.

Washer 70 serves as a spacer and as a spring seat structure. The washer also provides some reinforcement for the stamped piston to prevent fatiguing of the piston wall material due to the "oil can" effect during use. That is, washer 70 distributers the forces generated during use over a large area of the piston cup thereby preventing high stresses, material fatigue and the resulting material cracking which may occur without the use of washer 70.

Initial attempts to form the piston 45 and sleeve 46 as a one-piece stamping required such a large bend radius between end wall 48 and sleeve 46 that insufficient space remained on the inner face of end wall 48 to properly receive and securely seat springs 24 and 26 on a flat surface. Thus, in order to provide ample space for seating springs on a flat portion of the inner face of end wall 48, a two-piece piston and sleeve assembly was designed. This two-piece assembly not only properly seats the springs 24, 31, but also provides for closer tolerances between sleeve 46 and rod section 18 than is possible through stamping sleeve 46 and piston 45 as a one-piece component.

The FIG. 3 piston uses a different type of peripheral lip seal than the FIG. 1 piston. An annular elastomeric lip seal 77 is bonded to outturned flange 52. The seal includes two oppositely directed seal lip sections having cantilever connections to an intervening mounting section bonded to and around the flange 52 surface. Each lip section is resiliently movable toward or away from cylinder wall 42, such as to compensate for clearance variations that may occur in the annular spacing between the outer peripheral edge of flange 52 and cylinder wall 42. Of course, a single lip could be used for other applications.

The lip type seal of FIG. 3 has a greater ability to compensate for piston-cylinder clearance variations than the seal of FIG. 1. The lip seal is not new per se. However its use in the described piston-cylinder environment advantageously improves the seal action in that it effectively compensates for clearance variations that might occur between the piston and cylinder wall. The FIG. 3 seal is a relatively low cost alternative to the seal of FIG. 1. The FIG. 3 lip seal does not require any machining of the associated piston surface whereas the FIG. 1 seal requires some machining of the cast piston surfaces on lip 34.

Figure 5:
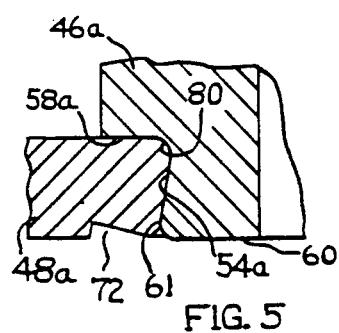
FIG. 5 is a view taken in the same direction as FIG. 4, but illustrating another form that the invention can take.

FIG. 5 shows an alternative form of the invention which does not make use of washer 70. In the FIG. 5 arrangement the upper face of piston end wall 48a is in direct pressure engagement with a radial shoulder 58a formed on sleeve 46a. Mandrel surface 54a extends generally axially from rounded corner 61, with a slight inward radial component toward the sleeve axis. The juncture 80 between radial shoulder 58a and mandrel surface 54a has a rounded or curved character.

Initially, the central hole in piston end wall 48a has a diameter that is very slightly oversize relative to the diameter across chamfered corner areas 61. Piston end wall 48a can be readily positioned against shoulder 58a. During the swaging or coining operation the hole edge material of wall 48a is driven radially into the zone bordered by mandrel surface 54a and curved surface 80. Radial shoulder 58a absorbs and redirects the deformation force toward curved surface 80. Mandrel section 59 forms a retainer surface that effectively retains wall 48a on sleeve 46a. In its entirety the piston shown fragmentarily in FIG. 5 will be constructed generally similarly to the piston shown in FIGS. 3 and 4, except for the absence of washer 70.

The sleeve-wall joint shown in FIG. 5 is old per se, in that a similar type connection has been previously used between a pin (rod) and a piston end wall. As far as is known, the FIG. 5 joint (connection) has not been used between a sleeve and a piston end wall. The connection shown in FIG. 4 is believed to be new in the art. The two piece sleeve-piston assembly shown in FIG. 3 is believed to be new in the art. It represents a potentially reduced cost and lighter weight alternative to the cast piston-sleeve unit shown in FIG. 1.

It will be seen from FIG. 3 that spring 31 has its opposite ends in pressure engagement with the piston end wall or washer 70 and cylinder end wall 33, without being affixed or attached to either end wall. This is somewhat disadvantageous from a manufacturing standpoint and from a parts stockage standpoint, since spring 31 is, in this design, a loose part that has to be separately handled and assembled into the cylinder.

In many cases the cylinder is built into a housing structure so that it is not replaced in the event that the piston and piston rod assembly fails in service. Usually a new piston and piston rod assembly will be installed into the pre-existing (old) cylinder. Preferably the piston and piston rod assembly is supplied as a single unitary structure so that it can be installed in a single operation, rather than as a series of operations involving multiple loose parts.

Figure 6:
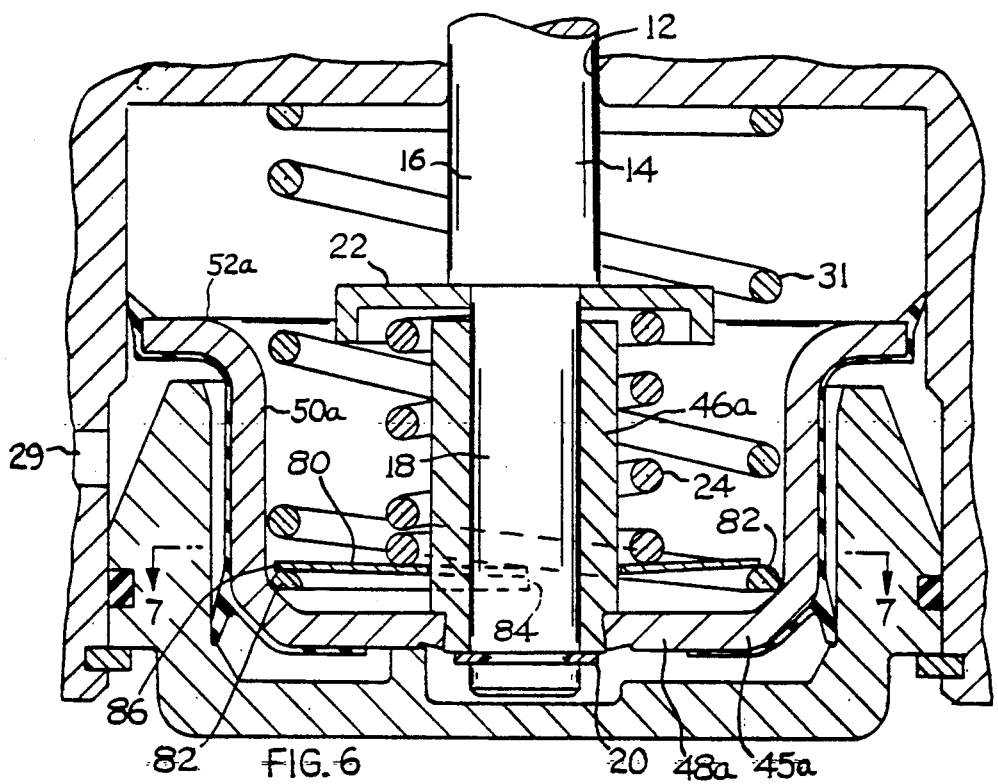
FIG. 6 is a sectional view taken in the same direction as FIG. 3, but illustrating another form of the invention.
Figure 7:
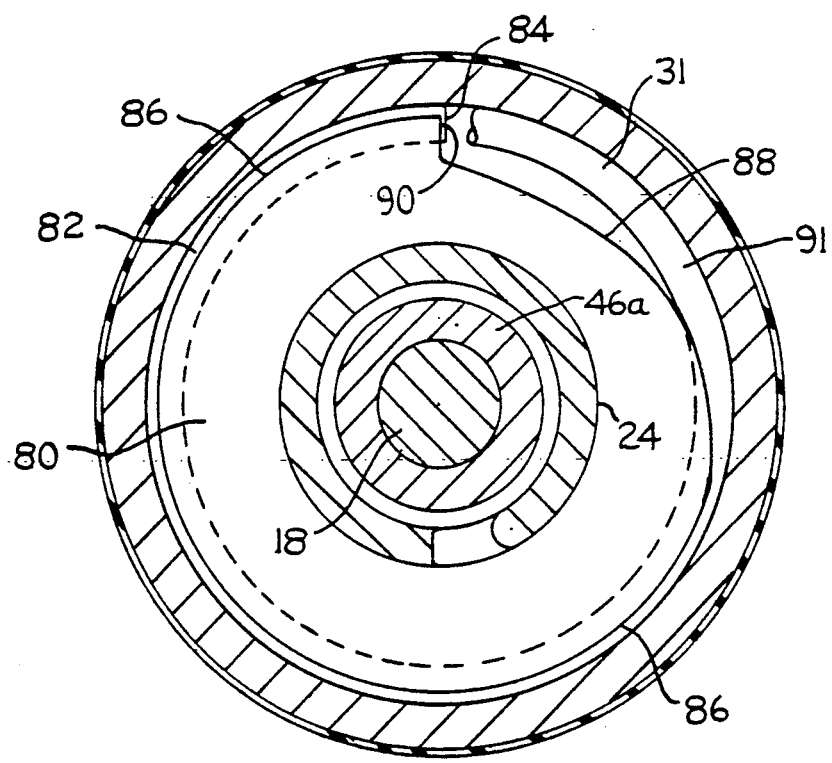
FIG. 7 is a sectional view taken on line 7—7 in FIG. 6.

FIGS. 6 and 7 illustrate a form of the invention wherein spring 31 is physically attached to the piston, such that there are no loose parts in the assembly. The springs, piston and piston rod make up one complete assembly. Operationally the FIG. 6 assembly performs essentially in the same fashion as the FIG. 3 assembly (or the assembly shown fragmentarily in FIG. 5).

The feature of principal interest in FIGS. 6 and 7 is a washer 80 located so that a portion of its outer edge area extends between an end convolution of spring 31 and the next associated convolution. Washer 80 has a relatively small axial thickness on the order of 0.03 inch so that it will be enabled to clear the portion of the spring end convolution that leads into the next associated convolution.

In FIG. 6 the end convolution of spring 31 is designated generally by numeral 82. The lower surface of this end convolution may be ground flat so that the spring may take a true axial position when it is installed into the piston. The extreme end or tip of the spring is designated by numeral 84.

Washer 80 has a central hole designed to have a relatively close sliding fit on sleeve 46a only during the installation process. The outer circumferential edge 86 of the washer is circular for the most part, and centered on the hole axis. However, approximately one fourth of the washer edge area is cut away to form a clearance space for the associated spring.

In FIG. 7 the cutaway area of the washer is designated by numeral 88. The cutaway area forms a radial edge 90 on the washer that is used as an orientation mark when the washer is assembled into spring 31. As shown in FIG. 7, the washer is installed so that radial edge 90 essentially or approximately overlies the tip end 84 of the spring 31. When the washer is inserted into the space between spring end 84 and the next uppermost spring convolution, the washer is gripped and wedged between the opposed spring surfaces so that the washer tends to stay in place.

The major diameter of washer 80 as defined by circular edge 86 is substantially the same as the major diameter of spring 31. The washer diameter may however be slightly less than the spring diameter, as shown in FIG. 6, to facilitate insertion of the spring washer assembly into the piston.

It should be noted that the plane of the end convolution 82 of the spring is essentially radial, i.e. flat and non-helical. However at about a point three quarters of a revolution from tip end 84 the spring starts to transition into a helical configuration. This transitional section of the spring is designated by numeral 91 in FIG. 7.

Washer 80 is oriented so that cutaway area 88 registers with transitional section 90 of the spring. As the spring section 90 starts to incline upwardly it passes through the cutaway space 88. At the point where the second spring convolution begins, i.e. directly above tip end 84, the spring lower face is above the general plane of the washer. As previously noted, the spring at that point exerts a downward gripping action on the washer to temporarily hold it in place.

The sequence of assembling the various components together includes as an initial step the insertion of washer 80 into spring 31, with the spring located outside piston 45a. The washer and spring assembly is then lowered into the piston, with sleeve 46a acting as a guide for the washer (hole). Spring 24 is then slipped downwardly over sleeve 46a so that its end convolution seats on the washer upper face. Piston rod 14 along with spring retainer 22 is then installed so that piston rod section 18 extends through sleeve 46a. The assembly is then fastened together with E ring retainer 20.

The piston and piston rod assembly with springs 31 and 24 is a unitary structure that can be handled, stored and installed in a pre-existing cylinder without potential loss or inadvertant non-use of spring 31. The spring is a permanent part of the piston-piston rod assembly. The spring-retention washer 80 could be used with the piston shown in FIGS. 3 or 5, with similar advantages as discussed above. It will be appreciated that some structural variations may be resorted to while practicing the invention, i.e. the invention is not limited to the exact arrangements shown in the drawings.

Various different seal configurations and cover designs can be utilized in conjunction with the illustrated piston. Also, the piston axial dimension may be varied within limits. FIGS. 3 and 6 show a relatively deep piston design, wherein a relatively long length side wall 50 or 50a is used. However, the axial dimension of the piston side wall can be relatively small without affecting performance. The axial dimension of the piston side wall is dictated at least partly, by the pre-existing dimensions of the cylinder in which the piston is to be used.

What is claimed is:

1. In combination, for use with a piston support rod: an annular sleeve supported by the piston support rod; and a piston affixed to said sleeve for movement therewith; said sleeve having an external annular undercut extending axially from one of its ends to define a mandrel surface and a radial shoulder; said piston being formed as a sheet metal stamping that includes a radial end wall, an annular side wall extending axially from said end wall, and a flange extending radially outwardly from said side wall; an annular sealing lip bonded to said flange; said lip being connected to said flange such that the lip is radially movable beyond the outer edge of the flange; said radial end wall having a central hole extending therethrough, with the hole edge surface engaged against the mandrel surface; said radial end wall having a surface section thereof deformed toward the juncture between the mandrel surface and associated radial shoulder so that the edge surface of the hole has pressurized sealing engagement with the mandrel surface; said mandrel surface extending at an acute angle to the associated radial shoulder to define a retaining means for retention of the piston end wall on the sleeve.

2. The combination of claim 1, wherein the mandrel surface is spaced radially outwardly from the sleeve inner surface by a distance that is at least fifty percent of the sleeve wall thickness.

3. The combination of claim 2, wherein said radial end wall has one face thereof in pressure engagement with the sleeve radial shoulder.

4. The combination of claim 2, and further comprising an annular flat-faced washer encircling the mandrel surface between the sleeve radial shoulder and piston end wall.

5. The combination of claim 4, wherein said sleeve has an end face spaced axially from said radial shoulder; said mandrel surface including a first annular surface section extending from said end face radially inwardly at an acute angle to the sleeve axis, and a second annular surface section extending from said radial shoulder radially inwardly at an acute angle to the sleeve axis; said first and second annular surface sections merging together to define a shallow V cross sectioned mandrel surface.

6. The combination of claim 5, wherein said annular surface sections have approximately the same cross sectional length.

7. The combination of claim 5, wherein said annular surface sections are acutely angled to the sleeve axis at approximately ten degrees.

8. The combination of claim 5, wherein said sleeve is formed of a relatively hard steel material, and said piston is formed of a relatively soft steel material, such that when the radial end wall of the piston is deformed the sleeve retains its initial configuration.

9. The combination of claim 5, wherein said sleeve and washer are each formed of a relatively hard steel material, and said piston is formed of a relatively soft steel material, such that when the radial end wall of the piston is deformed the sleeve and washer will remain undeformed.

10. The combination of claim 5, wherein the combined thickness of the washer and the piston radial end wall is about 0.18 inch.

11. The combination of claim 1, wherein said piston rod has a spring retainer and a retainer ring disposed at axially spaced points therealong; said piston being mounted on the piston rod so that its sleeve has limited axial motion between said spring retainer and said retainer ring; the combination further comprising a first relatively large diameter coil spring having an end convolution seated against the piston at the annular internal juncture between said radial end wall and said annular side wall; a second relatively small diameter coil spring encircling the piston sleeve; and an annular washer encircling said sleeve in near proximity to the piston end wall; said washer having an outer edge area thereof extending into the space between the end convolution of the first spring and the next associated convolution; said second coil spring being trained between said spring retainer and said washer; said retaining ring 20 being axially aligned with said one end of the piston sleeve for retaining said piston and both springs in operative position on the piston rod.

12. The combination of claim 11, wherein the major diameter of said washer is substantially the same as the major diameter of the first coil spring; said washer having a circular plan configuration, except that a minor section of the washer edge area is cut away to form a clearance space for a portion of the end convolution of the first spring that leads into the next associated convolution.

13. The combination of claim 12, wherein the edge area of the washer is cut away along approximately one fourth of the washer circumference.

* * * * *